Dec. 22, 1931.  J. ALBANY  1,837,389
FLOWERPOT SCRUBBING MACHINE
Filed Nov. 1, 1929    3 Sheets-Sheet 1

Inventor
John Albany,
by Harold J. Clark
Attorney

Dec. 22, 1931.  J. ALBANY  1,837,389
FLOWERPOT SCRUBBING MACHINE
Filed Nov. 1, 1929  3 Sheets-Sheet 2

Inventor
John Albany,
by Harold J. Clark.
Attorney

Dec. 22, 1931.  J. ALBANY  1,837,389
FLOWERPOT SCRUBBING MACHINE
Filed Nov. 1, 1929    3 Sheets-Sheet 3
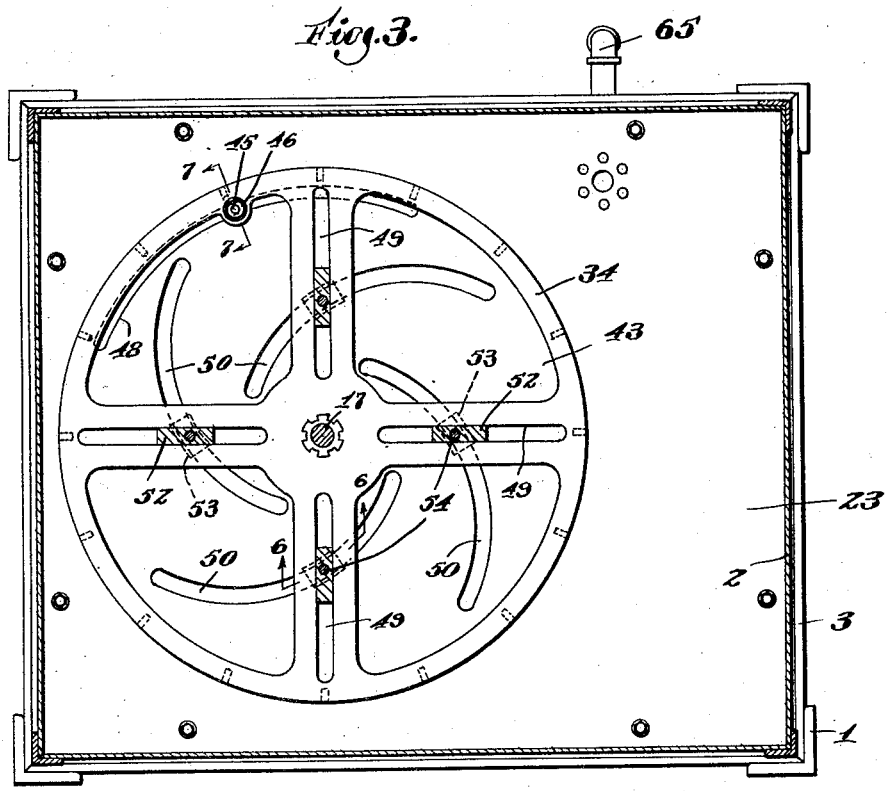
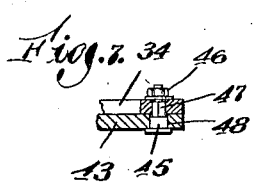
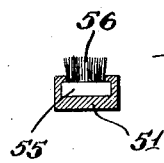
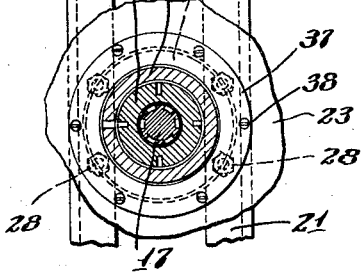
Inventor
John Albany,
by Harold J. Clark.
Attorney Patented Dec. 22, 1931

1,837,389

UNITED STATES PATENT OFFICE

JOHN ALBANY, OF BOSTON, MASSACHUSETTS

FLOWERPOT SCRUBBING MACHINE

Application filed November 1, 1929. Serial No. 404,060.

My present invention relates to machines which are particularly adapted for scrubbing and cleaning flower pots or similar shaped devices.

The item of scrubbing and cleaning flower pots, among florists and greenhouse operators, is a large one, particularly at those seasons of the year when the sale of flowers or potted plants is the heaviest. It is desirable, and in fact necessary, that each individual pot be scrubbed and cleaned on its exterior, before delivery to a customer, and it is the present practice among those in the floral profession, to employ crews of workmen at the rush seasons, it being the sole duty of such workmen to scrub or scour the flower pots, to remove therefrom the dirt, mold, fungus, or other matter which has accumulated in the greenhouse or hothouse.

An important object of my present invention, therefore, resides in the provision of a machine which will take the place of these crews of workmen, and which will quickly, efficiently, and properly, scour, scrub and clean the exterior of a flower pot without removing the plant or earth from the said pot.

Another and important feature of my present invention resides in the provision of a machine of this nature in which the motor and speed reduction unit will be continuously operated, but the scouring brushes and their supports will be stationary until a predetermined moment, that is, until the placing of a pot within the scouring receptacle and until the applying of pressure downwardly on said pot.

Another object of my invention is to provide means for simultaneously radially adjusting the cleaning brushes relative to the pot support, or the pot itself. In this manner the brushes may be moved away from a pot to permit removal thereof, or may be radially adjusted to accommodate pots of different widths.

Another feature of my invention resides in the particular structure and mechanism by means of which I am enabled to accomplish the above mentioned simultaneous radial adjustment of the brushes.

Another feature of my invention resides in the novel brush retaining means, by means of which the brushes may be readily removed and replaced, or reversed if desired, together with the provision of spring means cooperating with the brushes to retain said brushes in their holders.

Further features and objects of the invention reside in particular details of construction of the various portions of my novel machine.

All of the above, and other objects of the invention, features, details of construction, combinations of parts, and advantages, will be hereinafter more fully pointed out, described and claimed.

I believe that my present flower pot scrubbing machine, as above briefly described, is novel, and have therefore claimed the same in the present application.

Referring to the drawings, illustrating a preferred embodiment of the present invention, Fig. 1 is a vertical sectional view of my novel machine;

Fig. 3 is a plan sectional view on the line 3—3 of Fig. 1;

Fig. 5 is a cross sectional view on the line 5—5 of Fig. 1;

Fig. 6 is a cross sectional view on the line 6—6 of Fig. 3;

Fig. 7 is a cross sectional view on the line 7—7 of Fig. 3; and

Fig. 8 is a cross sectional view of a brush and holder on the line 8—8 of Fig. 4.

Figure 1:
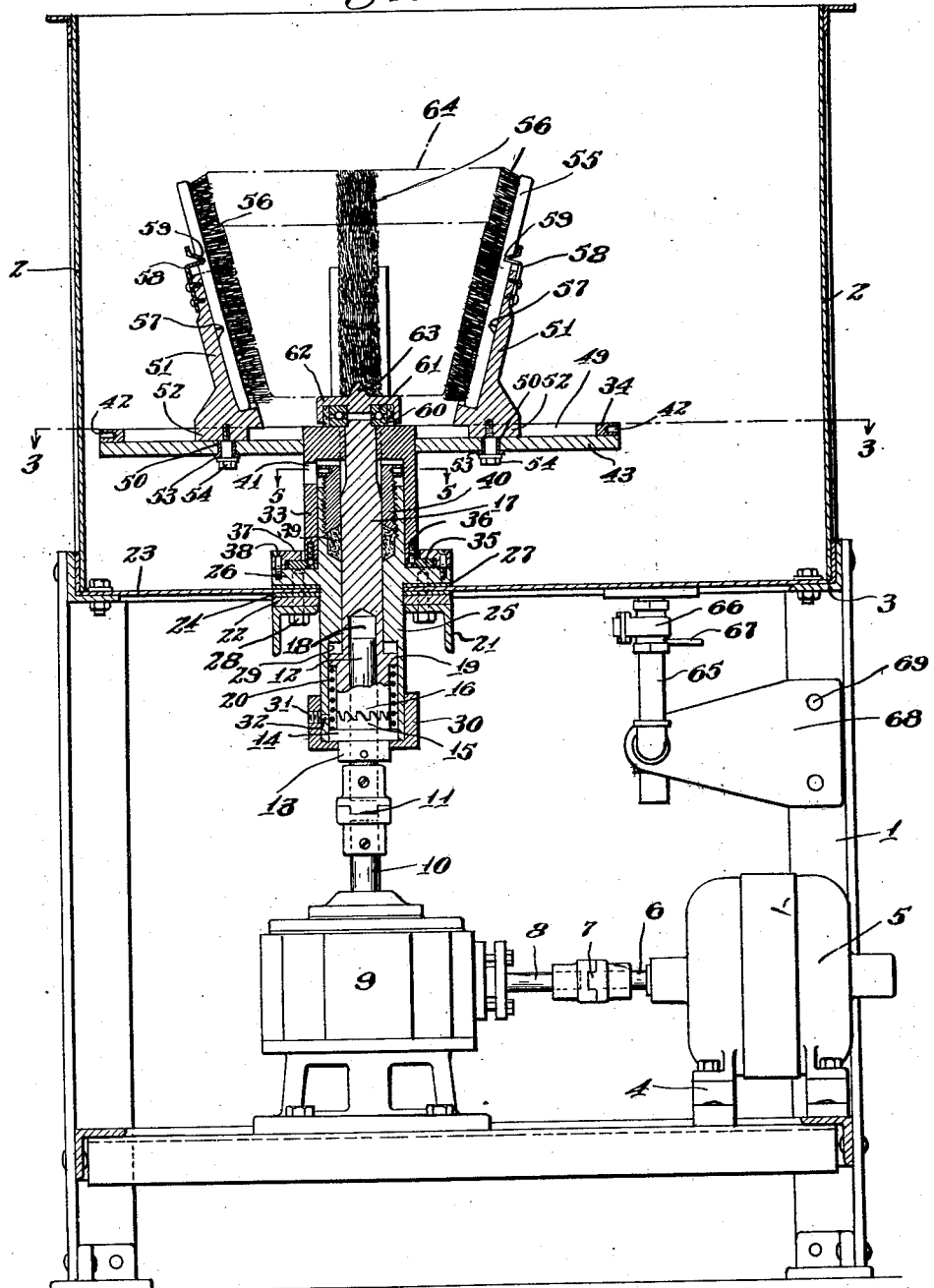
Figure 2:
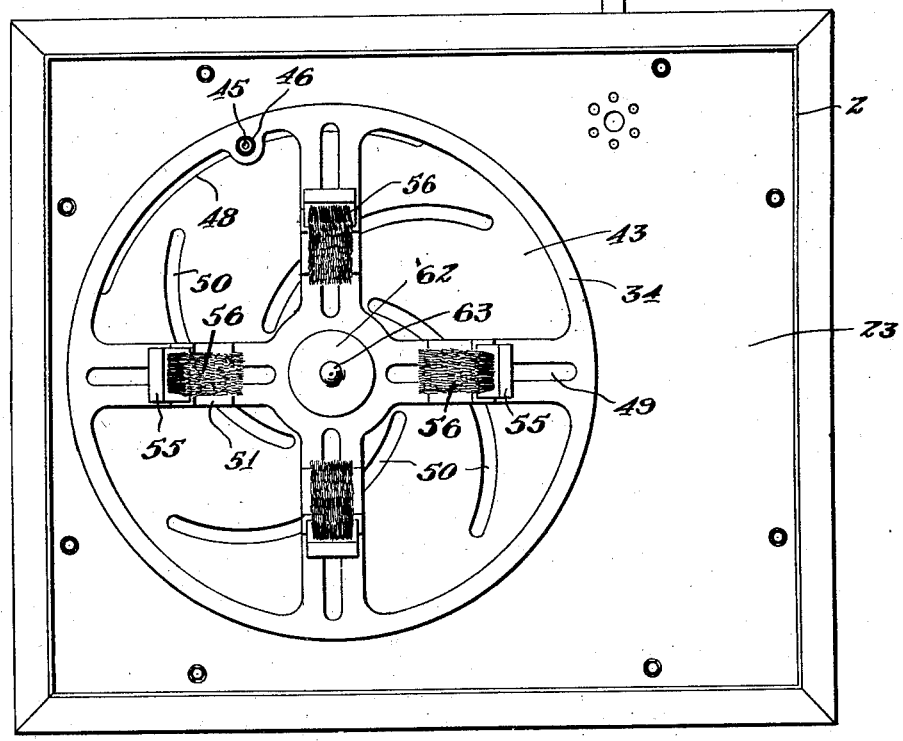
Fig. 2 is a top plan view of said machine.

Referring now to the drawings for a particular description of the invention, its construction, assembly and operation, my present novel machine comprises a framework 1 constituting a base, a tank 2 being secured to angle irons 3 which are in turn secured to the framework 1. Mounted in the framework 1, on suitable supports 4, is a motor 5, the motor shaft 6 driving, through a universal coupling 7, a shaft 8, said shaft 8 in turn operating a gear reduction unit 9. The gear reduction unit 9 is of standard construction, and the motor 5, unit 9 and shafts 6, 7 and 8, are a common article of manufacture, so that details of construction thereof need not be herein further described. Vertically projecting from the unit 9 is a shaft 10 driving, through the medium of a universal coupling 11, a shaft 12. Affixed to this shaft 12 is a sleeve 13 having thereon a collar 14 and one-half 15 of a clutch. The other half 16 of the clutch is formed on a shaft 17, said shaft being hollowed, at its lower end as at 18, to accommodate the upper end of the shaft 12 and form a bearing and guiding means therefor. The shaft 17 has a collar 19 thereon, and between the collar 14 and collar 19 is a coiled spring 20, which, bearing against the collar 19 normally tends to force the shaft 17 upwardly, and thus normally keeping the clutch sections 15 and 16 in disengaged position.

A pair of angle irons 21 are secured to the frame 1, and on top of these angle irons is secured a washer 22, and interposed between the washer 22 and the bottom 23 of the tank 2 is a gasket 24. A sleeve 25 surrounds the shaft 17 and has a collar 26 extending therefrom. Interposed between the collar 26 and the bottom 23 of the tank 2 is a gasket 27, the sleeve 25 being securely retained in position by means of bolts 28 passing upwardly through the angle irons 21 and into the collar 26. The lower end of the sleeve 25 is provided with an enlarged recess 29 to enable the sleeve to be slid over the collars 19 and 14, to conceal and protect the spring 20 and the clutch members 15 and 16. A cap 30 is secured to the lower end of the sleeve 25 by means of a set screw 31, lubrication being admitted to the recess 29 through an aperture 32.

Splined to the upper end of the shaft 17 is the depending hollow boss 33 of a plate 34, a washer 35 being fixed to the lower end of the portion 33 by screws 36, a flanged ring 37 fixed to the collar 26 by screws 38 constituting a retainer for said washer 35. Within the sleeve 25 is a packing 39 surrounding the shaft 17, a gland 40 being threaded to the upper end of said sleeve 25, adjustment of the gland 40 being effected by inserting a pin or the like through the elongated slot 41 in the depending portion 33, and then rotating said portion 33 to tighten or loosen the gland 40 as desired.

The plate 34 is provided with a plurality of recesses 42, and the plate 43 beneath the plate 34 is provided with a plurality of recesses 44, by means of which apertures the plates 34 and 43 may be rotated relative to each other. The plates 34 and 43 are clamped together by means of a bolt 45 and nut 46, the bolt 45 being square as illustrated at 47, to permit manipulation of the nut 46 without rotation of the bolt 45.

An arcuate slot 48 is provided adjacent to the periphery of the plate 43, and the bolt 45 extends upwardly through this slot 48. Therefore, on loosening of the nut 46, the two plates 34 and 43 may be rotated relative to each other within the limits of the length of the slot 48. When rotated to desired position, the nut 46 may then be tightened and the two plates 43 and 34 will be securely clamped together.

The plate 34 is provided with a plurality of straight slots 49 and the plate 43 is provided with a plurality of arcuate slots 50. Mounted on the plate 34 are a plurality of brush supports 51, each having a depending lug 52 seated in a slot 49. Located in each arcuate slot 50 is an arcuate flanged slide block 53, a bolt 54 extending through each block 53 and into each lug 52 and retaining said blocks in position while still permitting sliding of said blocks 53 in their slots 50.

It will thus be instantly apparent that, on rotation of the plates 34 and 43 relative to each other, the blocks 53 will slide in their slots 50, and will effect a simultaneous radial adjustment of the brush supports 51 either toward the center or away therefrom.

A plurality of brushes comprising backs 55 and bristles 56 are provided, each back 55 being inserted into its support 51, as clearly illustrated in Figures 1, 2, 4 and 8. Each back 55 is provided with a pair of notches 57, and affixed to each support 51 is a spring 58 having a detent 59 adapted to snap into one of the notches 57. Thus these brushes 55 may be reversed, by withdrawal from the supports 51 and reversing the ends. When the brushes are reinserted in the supports 51, the detents 59 will engage the uppermost notch 57, preventing accidental removal of the brushes 55 from their supports.

Affixed to the upper end of the shaft 17 is one race 60 of an anti-friction bearing, the other race 61 being carried by a cap 62, said cap having a central boss 63.

The operation of my present novel machine is simple, and will be readily understood by those skilled in the art.

Figure 4:
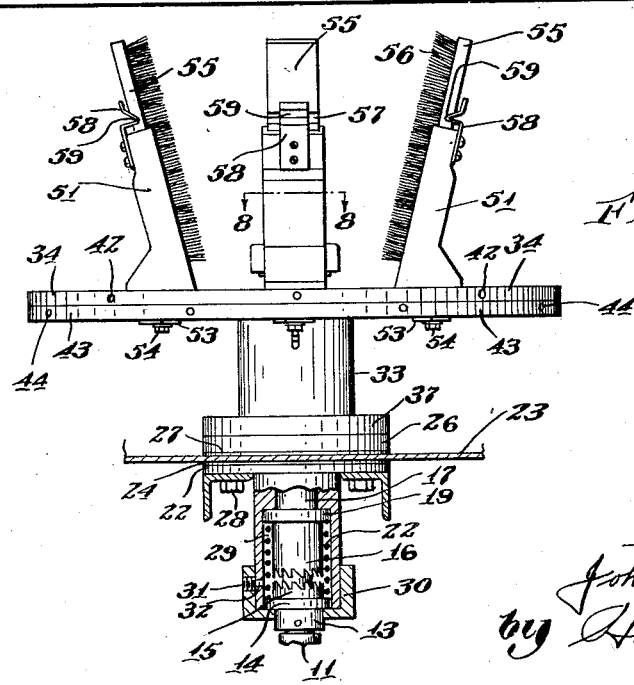
Fig. 4 is an elevation of the scouring portion of my machine, particularly in section to illustrate the clutch mechanism.

It being desired to scrub or scour a pot, for example as illustrated in dotted lines at 64 in Fig. 1, the brush supports 51 are adjusted to the diameter required to accommodate the pot 64. The motor 5 may be in constant operation, as well as the reduction unit 9 and shaft 12. Before the pot 64 is applied to the machine, the clutch sections 15 and 16 will be disengaged, as illustrated in Fig. 4. When the pot is inserted within the confines of the brushes, it is centered by the boss 63 engaging the central aperture in the bottom of said pot. Thereupon pressure of the pot 64 downwardly will effect engagement or meshing of the clutch section 16 with the clutch section 15 effecting rotation of the shaft 17, plates 34 and 43, and the brush supports 51 and the brushes carried thereby, the cap 62 not rotating, because of the interpositioning of the anti-friction bearing between said cap and said shaft 17.

The rotation of the bristles 56 about the pot 64 will quickly, efficiently, and positively effect a thorough cleaning or scrubbing of the pot 64, and the operator may withdraw the clean pot and replace a dirty pot in a very short time. If pots of greater height are to be utilized, it will be understood that brushes of greater length will also be utilized. It will be appreciated that my novel machine will enable an operator to thoroughly clean flower pots or the like at a much greater rate of speed than has been heretofore possible when cleaning such pots by hand, and one operator can clean, by the use of my machine, as many pots as a large crew of workmen could ordinarily clean.

As soon as pressure on the pot 64 is released, the spring 20 will force the shaft 17 upwardly and disengage the clutch section 16 from the clutch section 15, thus preventing further rotation of the brushes until the application of another pot to the machine under sufficient pressure to again engage said clutch sections.

A drain pipe 65 is provided, in which is positioned a throttle valve 66 and a manipulating handle 67, by means of which the tank 2 may be drained in a very short space of time. A bracket 68 secured to the frame 1 by rivets 69 or the like supports the drain pipe 65.

While I have necessarily described my present invention somewhat in detail, it will be appreciated that I may vary the size, shape and arrangement of parts, within reasonably wide limits without departing from the spirit of the invention.

My invention is further described and defined in the form of claims as follows:

1. In a flower pot scrubbing machine, a tank adapted to hold a supply of water, a continuously rotating shaft, a second shaft normally operatively disengaged from said continuously rotating shaft, a pot support carried by and rotatable on said second shaft and located in said tank, a plurality of brushes around said support having connections with said second shaft for revolving around said support, said second shaft being downwardly slidable upon the application of pressure on said support, and means to transmit rotation of said first shaft to said second shaft and to said brushes on downward movement of said second shaft.

2. In a flower pot scrubbing machine, a tank adapted to hold a supply of water, a continuously rotating shaft, a second shaft normally operatively disengaged from said continuously rotating shaft, spring means to retain said second shaft in normally disengaged position, a pot support carried by and rotatable on said second shaft and located in said tank, a plurality of brushes around said support having connections with said second shaft for revolving around said support, said second shaft being downwardly slidable upon the application of pressure on said support, and means to transmit rotation of said first shaft to said second shaft and to said brushes on downward movement of said second shaft.

3. In a flower pot scrubbing machine, a tank adapted to hold a supply of water, a continuously rotating shaft, a second shaft normally operatively disengaged from said continuously rotating shaft, spring means to retain said second shaft in normally disengaged position, a pot support carried by and rotatable on said second shaft and located in said tank, a plurality of brushes around said support having connections with said second shaft for revolving around said support, said second shaft being downwardly slidable upon the application of pressure on said support, a clutch section carried by each of said shafts, said clutch sections engaging on downward movement of said second shaft to transmit rotation from said continuously rotating shaft to said second shaft and to said brushes.

4. In a flower pot scrubbing machine, a tank adapted to hold a supply of water, a continously rotating shaft, a second shaft normally operatively disengaged from said continuously rotating shaft, spring means to retain said second shaft in normally disengaged position, a pot support carried by and rotatable on said second shaft and located in said tank, a plurality of brushes around said support having connections with said second shaft for revolving around said support, said second shaft being downwardly slidable upon the application of pressure on said support, and means to transmit rotation of said first shaft to said second shaft and to said brushes on downward movement of said second shaft, said continuously rotating shaft projecting into and having a bearing in said second shaft.

5. In a flower pot scrubbing machine, a continuously rotating shaft, a second shaft, a pot support carried by said second shaft, a plurality of brushes around said support having connections with said second shaft for revolving around said support, said second shaft being downwardly slidable upon the application of pressure on said support, a clutch section carried by each of said shafts, a collar on each of said shafts, and a coiled spring surrounding said clutch sections and confined between said collars to retain said second shaft in normally disengaged position, said clutch sections engaging on downward movement of said second shaft to transmit rotation from said continuously rotating shaft to said second shaft and to said brushes.

6. In a flower pot scrubbing machine, a tank adapted to hold a supply of water, a continuously rotating shaft, a second shaft normally operatively disengaged from said continuously rotating shaft, a pot support carried by and rotatable on said second shaft and located in said tank, a plate secured to said second shaft within said tank, a plurality of brushes carried by said plate, said second shaft being downwardly slidable upon the application of pressure on said support, and means to transmit rotation of said first shaft to said second shaft and to said plate on downward movement of said second shaft.

7. In a flower pot scrubbing machine, a tank adapted to hold a supply of water, a continuously rotating shaft, a second shaft normally operatively disengaged from said continuously rotating shaft, a pot support carried by and rotatable on said second shaft and located in said tank, a plate secured to said second shaft within said tank, a plurality of brushes carried by said plate, said second shaft being downwardly slidable upon the application of pressure on said support, means to transmit rotation of said first shaft to said second shaft and to said plate on downward movement of said second shaft, and spring means to automatically return said second shaft to disengaged position upon the release of pressure thereon.

8. In a flower pot scrubbing machine, a tank adapted to hold a supply of water, a continuously rotating shaft, a second shaft normally operatively disengaged from said continuously rotating shaft, a pot support carried by and rotatable on said second shaft and located in said tank, a plate secured to said second shaft within said tank, a plurality of brushes carried by said plate, said second shaft being downwardly slidable upon the application of pressure on said support, means to transmit rotation of said first shaft to said second shaft and to said plate on downward movement of said second shaft, spring means to automatically return said second shaft to disengaged position upon the release of pressure thereon, and a non-rotatable protecting and concealing cover for said spring means.

9. In a flower pot scrubbing machine, a tank adapted to hold a supply of water, a continuously rotating shaft, a second shaft normally operatively disengaged from said continuously rotating shaft, a pot support carried by and rotatable on said second shaft and located in said tank, a plate secured to said second shaft within said tank, a plurality of brushes carried by said plate, said second shaft being downwardly slidable upon the application of pressure on said support, a clutch section carried by each of said shafts, said clutch sections engaging on downward movement of said second shaft to transmit rotation from said continuously rotating shaft to said second shaft and to said plate, and spring means to automatically return said second shaft to disengaged position upon the release of pressure thereon.

10. In a flower pot scrubbing machine, a tank adapted to hold a supply of water, a continuously rotating shaft, a second shaft normally operatively disengaged from said continuously rotating shaft, a pot support carried by and rotatable on said second shaft and located in said tank, a plate secured to said second shaft within said tank, a plurality of brushes carried by said plate, said second shaft being downwardly slidable upon the application of pressure on said support, a clutch section carried by each of said shafts, said clutch sections engaging on downward movement of said second shaft to transmit rotation from said continuously rotating shaft to said second shaft and to said plate, spring means to automatically return said second shaft to disengaged position upon the release of pressure thereon, and a non-rotatable protecting and concealing cover for said spring means and said clutch sections.

In testimony whereof, I have signed my name to this specification.

JOHN ALBANY.